United States Patent [19]
Lioutas et al.

[11] Patent Number: 6,054,168
[45] Date of Patent: Apr. 25, 2000

[54] CITRUS PRODUCTS INCORPORATING PULP PROCESSING

[75] Inventors: Theodore S. Lioutas; Osvaldo Chu, both of Sarasota, Fla.

[73] Assignee: Tropicana Products, Inc., Bradenton, Fla.

[21] Appl. No.: 09/209,161

[22] Filed: Dec. 10, 1998

[51] Int. Cl.[7] ................................ A23L 2/70; A23L 2/74
[52] U.S. Cl. .................. 426/599; 426/330.5; 426/333; 426/478; 426/495; 426/599; 426/616
[58] Field of Search .................................. 426/616, 478, 426/495, 333, 330.5, 599

[56] References Cited

U.S. PATENT DOCUMENTS

| | | |
|---|---|---|
| 3,165,415 | 1/1965 | Kilburn et al. . |
| 3,801,717 | 4/1974 | Huffman . |
| 4,225,628 | 9/1980 | Lynn . |
| 4,439,458 | 3/1984 | Puri . |
| 4,477,481 | 10/1984 | Eisenhardt, Jr. et al. ............. 426/616 |
| 4,514,427 | 4/1985 | Mitchell et al. . |
| 4,522,836 | 6/1985 | Dechow et al. . |
| 4,643,902 | 2/1987 | Lawhon et al. . |
| 4,666,721 | 5/1987 | Norman et al. . |
| 4,959,237 | 9/1990 | Walker . |
| 4,965,083 | 10/1990 | Norman et al. . |
| 5,411,755 | 5/1995 | Downton et al. . |
| 5,817,354 | 10/1998 | Mozaffar et al. . |
| 5,885,638 | 3/1999 | Takayanagi et al. ................... 426/616 |

OTHER PUBLICATIONS

Hernandez et al, Evaluation of Ultrafiltration and Adsorption to Debitter Grapefruit, Journal of Food Science, 1992.

*Primary Examiner*—Helen Pratt
*Attorney, Agent, or Firm*—Cook, Alex, McFarron, Manzo, Cummings & Mehler

[57] ABSTRACT

Citrus products are provided which incorporate components from pulp material separated from a citrus juice source. The invention is especially beneficial in connection with grapefruit sources. Naringin or other bitterant levels are reduced substantially in all phases of the citrus source, including pulp components. In a particular application, the citrus product is a grapefruit juice product which is organoleptically identified as grapefruit juice when it stands alone but is not organoleptically identified as grapefruit juice when blended with other fruit juice sources.

32 Claims, 1 Drawing Sheet

CITRUS PRODUCTS INCORPORATING PULP PROCESSING

BACKGROUND OF THE INVENTION

This invention generally relates to citrus-originating products and processes for making them. More particularly, the invention separates a citrus juice source into a permeate liquid and a retentate containing virtually all of the pulp present in the citrus juice source. This pulp retentate is subjected to diafiltration, which reduces levels of bitterants such as naringin within the pulpy material, and certain diafiltration products are processed as or into useful juices and/or clouding agents which have blandness characteristics as desired.

Citrus fruits have long been recognized as valuable sources of important nutrients. More recently, health benefits and disease retarding or treating benefits of citrus sources have come to be more fully recognized as advantageous and beneficial when ingested. Accordingly, there is a general belief that increasing the intake of citrus-originating foods is a beneficial and important objective in the overall scheme of human health.

Segments of the population are less than enthusiastic about certain characteristics of citrus products, such as bitterness, acidity, and a thick consistency. Concerns about these types of characteristics are perhaps most prevalent when the citrus product or ingredient is grapefruit originating. Other citrus fruits can present these types of concerns, including orange, tangerine and lemon fruits. In terms of volume of juice and percentage of dislike in the juice-consuming population, grapefruit products present both the greatest challenge and the most promising potential. Heretofore, grapefruit resources have been underutilized due to these types of characteristics of grapefruit sources, which characteristics can be considered objectionable to certain segments of the population.

Numerous approaches have been taken in the past which incorporate various filtration and ion exchange technology in order to operate upon citrus juice sources with a view toward preparing a variety of different products and byproducts. These approaches typically do not substantially change the characteristics of or operate on pulp components. It has long been known that citrus pulp can be separated from citrus juice. Often, this involves removing pulp so as to provide a so-called clarified juice. In those instances, the separated pulp is discarded, used in low-value products such as animal feed, or is stored for reintroduction of some of it into juice products which are formulated to have high pulp contents.

It will thus be seen that, in many instances, citrus fruit pulp is not used in a high value manner. For this reason and others, citrus fruits are not used to their full potential, and many valuable nutrients are not put to use in a manner which directly benefits people. This is particularly true for separated components which include the citrus pulp. There is accordingly a need for approaches which allow a more complete realization of the potential of citrus fruits, and especially of grapefruit sources.

Many blended juice products are currently marketed. Most such products include as a primary component what has come to be known as "filler" juice. A filler juice is a relatively inexpensive juice source which is suitable for blending with other juices or juice flavors which are generally known as "key" flavors. These key flavor juices or flavorings are generally dominant on the senses, especially taste, with the result that a blended juice product can contain relatively low levels of key juice sources while still achieving the desired blended flavor of key juice(s). In the past, the primary filler juices have been apple juice and/or grape juice, particularly white grape juice. These traditional types of filler juices are generally considerably lower in nutritional content than are citrus juices. They are advantageous as filler juices because of their relatively low cost and relatively bland flavor.

Accordingly, there is a need for a relatively inexpensive and bland juice source which has greater nutritional value than these types of traditional filler juices. Also needed is a natural source of bland clouding agent or pulp for use in juice products and other potential uses. Fulfilling these needs with citrus sources would allow for juice products, clouding agents, blended juice products, and combinations thereof which are more nutritious than in the past and without substantially increasing their cost, or even reducing total cost.

SUMMARY OF THE INVENTION

In accordance with the present invention, citrus fruit sources are processed into a variety of unique products which are relatively low in bitterness attributes, which can be of reduced acidity, and which exhibit a clarity attribute which can be tailored according to real or perceived needs without significantly increasing bitterness or acidity. Products include a clear filler juice, a cloudy filler juice, a cloudy stand-alone juice, and a bland clouding agent or source of bland pulp. Each of these products is entirely natural. The nutrients present in the citrus fruit source are effectively recovered in one or more of the products. Included is diafiltration of a pulp-rich retentate from filtration of a citrus juice supply or concentrated citrus juice supply. Bitterant reduction results. Permeate and/or retentate from the diafiltration will be further processed and included within one or more of the final products.

It is accordingly a general object of the present invention to provide improved citrus juice products and processes which incorporate bland pulp components and/or byproducts.

Another object of the present invention is to provide improved citrus fruit processing and products which improve the overall yield of citrus fruit sources.

Another object of this invention is to provide an improved citrus juice product which is a clear filler juice incorporating permeate from a citrus pulp source.

Another object of this invention is to provide a cloudy filler juice which incorporates a bland pulp or clouding agent retentate of a citrus juice pulp source.

Another object of the present invention is to provide an improved cloudy stand-alone citrus juice which incorporates a bland pulp or clouding agent which is a retentate from a citrus pulp source.

Another object of this invention is to provide a filler juice which is recognized as a particular citrus juice, such as grapefruit juice, but which cannot typically be identified as this citrus juice when same is blended with a variety of key juice sources in a prepared blended juice product.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein.

DESCRIPTION OF THE PREFERRED EMBODIMENTS

The present invention is directed toward citrus fruit originating products and processes for making them. Citrus fruits include grapefruit, orange, tangerine and lemon fruits. The invention is especially well suited for grapefruit products. For convenience, the citrus fruit which is substantially exclusively discussed herein is grapefruit, and the citrus bitterant which is primarily discussed is naringin. It is generally believed that the principles of this invention, while applicable to other citrus fruit sources, are most advantageously applied to grapefruit sources, both because of their relative abundance and the disfavor with which grapefruit juice products are held by a large segment of the population. The present invention takes advantage of the abundance of grapefruit sources while successfully addressing concerns regarding perceived negative attributes of grapefruit-originating products. As a result, previously unavailable products are provided, including grapefruit-originating filler juices and juices having grapefruit-originating bland clouding agents.

Figure 1:
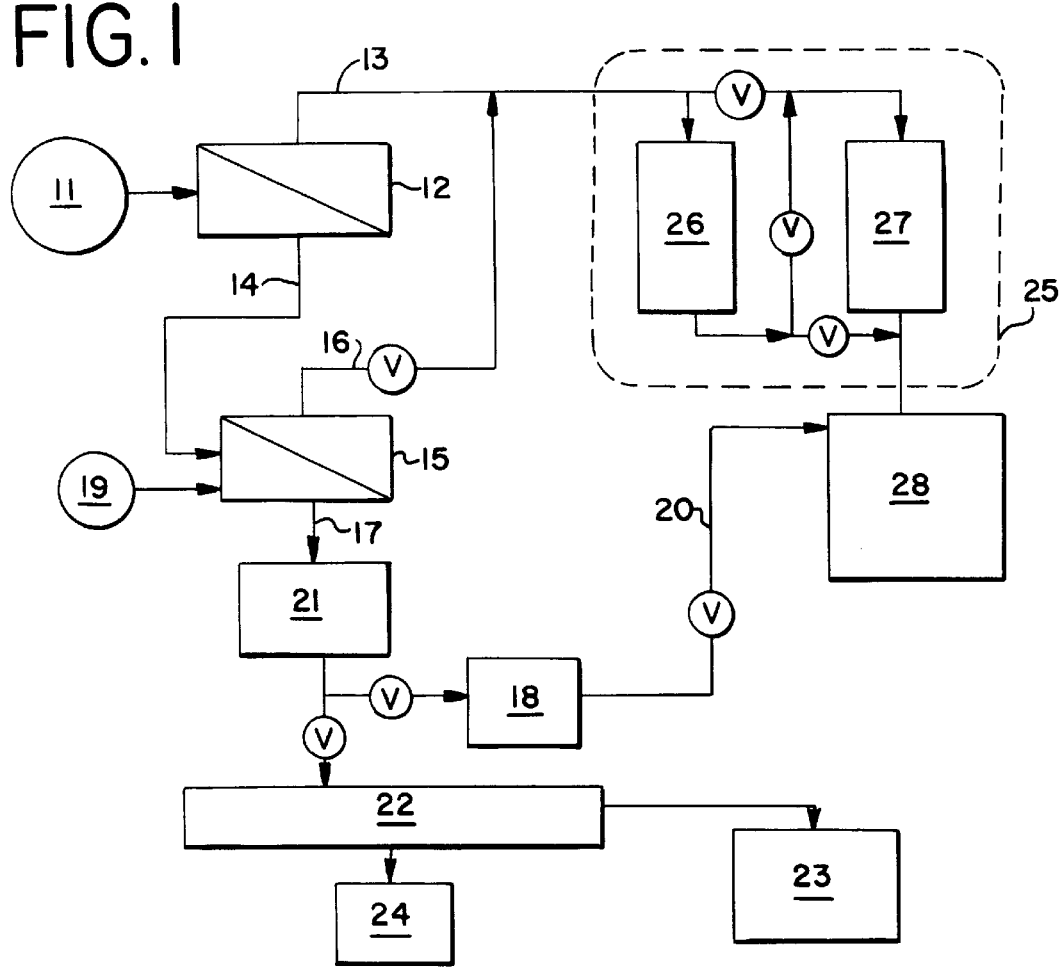
FIG. 1 is a schematic representation of an embodiment of the invention which can be used in preparing a clear filler juice.

With reference to FIG. 1, a citrus juice 11 is the originating material. It can be a grapefruit juice or a concentrated grapefruit juice. A typical juice would have a soluble solids or sugars level of 8–15° Brix. As is well-known in the art, such Brix levels will be considerably higher as the juice source is provided in a more concentrated condition, so that these solids or sugars correspondence levels can be as high as 60° Brix and above.

Citrus juice 11, when provided as a relatively unconcentrated grapefruit juice, will have a level of natural bitterant(s) which varies with the originating fruit. A typical range is between about 500 ppm and about 1200 ppm naringin for grapefruit sources. Supply 11 will also have a naturally occurring acidity level, typically primarily citric acid, of between about 0.70 weight percent to about 1.20 weight percent. Citrus juice source 11 flows into a membrane filtration unit 12. Typically unit 12 will incorporate an ultrafiltration membrane. A typical membrane of this type will have a minimum pore size of about 30 Angstroms, which generally equates to a Molecular Weight Cut Off (MWCO) of about 2000. A typical ultrafiltration membrane maximum pore size is about 1000 Angstroms (1 micron), which generally equates to 100,000 MWCO.

Filtration unit 12 separates the flow from the citrus juice source 11 into a permeate which moves into a transfer member 13 and a retentate which moves into a transfer member 14. This permeate continues to have the Brix level, naringin level and acidity level approximating those of the citrus juice source 11. It is substantially devoid of any pulp or clouding solids. The retentate from filtration unit 12 retains virtually all of the natural solids or pulp material. This retentate can be generally referred to as citrus pulp. It also has the Brix level, naringin level and acidity level approximating those of the citrus juice source 11.

A diafiltration unit 15 receives the citrus pulp retentate from the transfer member 14. As is generally known in the art, a diafiltration unit accomplishes filtration through the use of a washing system which applies a liquid to the filtration media. It has been found that such an approach allows soluble components within the citrus pulp retentate to be dissolved so as to pass through the filtration media, while the pulp solids collect as a diafiltration retentate. In an illustrated arrangement, between approximately 75% and 90% of the soluble components find their way into the diafiltration permeate and to transfer member 16. It has been found that, by proceeding with this approach, most of the following components find their way into the diafiltration permeate: naringin or other bitterant(s), sugars, acid, vitamins and nutrients including vitamin C, minerals and the like. Conversely, only between about 10% and 25% of these same components remain in the diafiltration retentate, which passes to a transfer member 17.

This diafiltration retentate is an all-natural bland clouding agent. It can have a naringin level of between about 20 ppm and about 100 ppm. Higher naringin levels can be selected, as the need dictates. It has an acidity level of not higher than approximately 0.3 weight percent. Higher acidity levels can be selected. Its sugar content is relatively low, this bland clouding agent being at about 2–3° Brix. This all-natural bland clouding agent passes from the collection vessel 21 into receptacle 18. It has been found to be suitable as a source of pulp or "cloud" for a filler juice or a stand-alone juice product. It has been found that this product can be used as an additive, such as through transfer member 20, for a juice according to an aspect of this invention. As such an additive, it provides an all-natural bland clouding agent which has been found to be instrumental in providing visual cues which allow a consumer to identify the citrus source, particularly a grapefruit source, even for a juice which has a very low naringin level and has a reduced acidity level.

The relative percentage amount of diafiltered materials varies with the particular type of equipment within which the diafiltration is carried out. This also varies in accordance with the volume of liquid, typically water, which is used in the diafiltration equipment, such as from wash source 19. More particularly, the volume of wash liquid from source 19 will be from about 2 times to about 5 times the volume of citrus pulp retentate entering the diafiltration unit 15 from the transfer member 14. It has been found that suitable results can be achieved in a typical large-scale diafiltration unit if the wash volume is between about 2.5 and about 4 times the volume of the citrus pulp entering the diafiltration unit 15. Preferably, the wash liquid is at a temperature of between about 80° F. and about 130° F.

Depending upon the relative amount of water within the all-natural bland clouding agent, it may be desired to reduce its water level in order to provide a somewhat more concentrated clouding agent. In this instance, the all-natural bland clouding agent will move from area 21 to a separation apparatus 22 which is suitable for separating liquids and solids. A typical separation apparatus is a filter press. Other options include a centrifuge, a decanter, or a vibrating press. It can also include traditional crossflow filtration filters or even devices using vibrating filter technology. Passage of the all-natural bland clouding agent through the separation apparatus 22 forms a pulp wash byproduct 23 and an all-natural bland concentrated pulp or clouding agent 24. This concentrated product has properties similar to the all-natural bland clouding agent 18, as adjusted by the reduced water level. If desired, this could be added to a juice product according to the invention.

With further reference to FIG. 1, the permeate flow or pulp byproduct flow from the diafiltration unit can be moved from the transfer member 16 to a debittering and/or deacidifying section 25. This flow contains substantially all of the nutrients from the flow into the diafiltration unit. This passage can be directly into the section 25 or into transfer member 13 before it enters debittering and/or deacidifying section 25. At section 25, one or more debittering columns 26 are included. This debittering line is as generally known in the art and results in substantial reduction of naturally occurring bittering agents. Typically, adsorption resins are used in section 25. Commercial adsorption systems are available for use in section 25. Examples include systems incorporating ion exchange resins such as cationic polystyrene adsorbent resins, cationic acrylic adsorbent resins, polyamide resins, anionic polystyrene copolymers which release chloride groups, basic anionic polystyrene resins having quaternary ammonium active groups, and other suitable resins or other adsorbents which are known and available in the art for use in these types of systems. Examples of adsorbents and ion exchange resins for debittering and/or deacidification are found in U.S. Pat. Nos. 4,297,220, 4,439,458, 4,514,427 and 5,817,354, each incorporated hereinto by reference.

For grapefruit sources, the primary bittering agent to be removed is naringin, which is the predominant flavanone glycoside that naturally occurs in grapefruit. Other bittering agents can be removed here. The flavanone glycoside hesperidin is predominant in orange and tangerine citrus fruits. Compounds falling within the limonoids group are also found in citrus fruits, including limonin and nomilin. These are the types of bitterants which are substantially reduced within the debittering columns.

With particular reference to grapefruit, when a substantial quantity of the naringin content is removed from the diafiltration permeate and from the membrane filtration permeate, the result is a grapefruit juice which is substantially less bitter than unprocessed grapefruit juice. When the naringin level is especially substantially reduced, it can be difficult to identify the resultant juice as grapefruit originating. It will be appreciated that varying naringin levels can be selected, for example, between about 20 ppm and about 200 ppm naringin can remain. For many products, the naringin level will be between about 50 ppm and 150 ppm. An especially bland or debittered grapefruit juice product which is suitable for use as a clear filler juice which may be recognized as grapefruit juice (about 200 ppm, typically not greater than) when tasted alone has a naringin level of between about 80 ppm and about 180 ppm, often not greater than about 120 ppm. This can be generally referred to as a clear filler juice.

In many instances, it is also desired to reduce the acidity of the citrus juice source 11. This also can be the case for the diafiltration permeate from the transfer member 16. In these instances, the section 25 includes one or more deacidification columns 27. Deacidification equipment represented by column 27 is generally known. It has the ability to significantly reduce the acid content of citrus juices. Many citrus juices have a natural acidity of at least about 0.5 weight percent. A typical acidity content after passage through column 27 will be between about 0.3 and about 0.9 weight percent. A typical range is between about 0.4 and about 0.8 weight percent acid, typically as citric acid. Acidity can also play a role in identifying a juice as a particular citrus juice. For example, when it is desired to detect juice as a grapefruit juice, it is often desirable to have an acidity level generally between about 0.4 and about 0.8 weight percent. It has been found that maintaining this acidity level, which can be augmented by adding a relatively minor amount (for example as low as about 2 weight percent) of the all-natural bland clouding agent, results in the recognizability of the juice product as a grapefruit juice product, but without any of the negative flavor notes which have come to be associated with naringin in grapefruit juice.

Whether the clear filler juice in accordance with this aspect of the invention is only debittered or is both debittered and deacidified, it passes out of the section 25 and into a suitable receptacle 28 for this clear filler juice. When thus fully processed, this clear filler juice, when originating from grapefruit, can be referred to as CDDGT (clarified, debittered, deacidified grapefruit juice).

Figure 2:
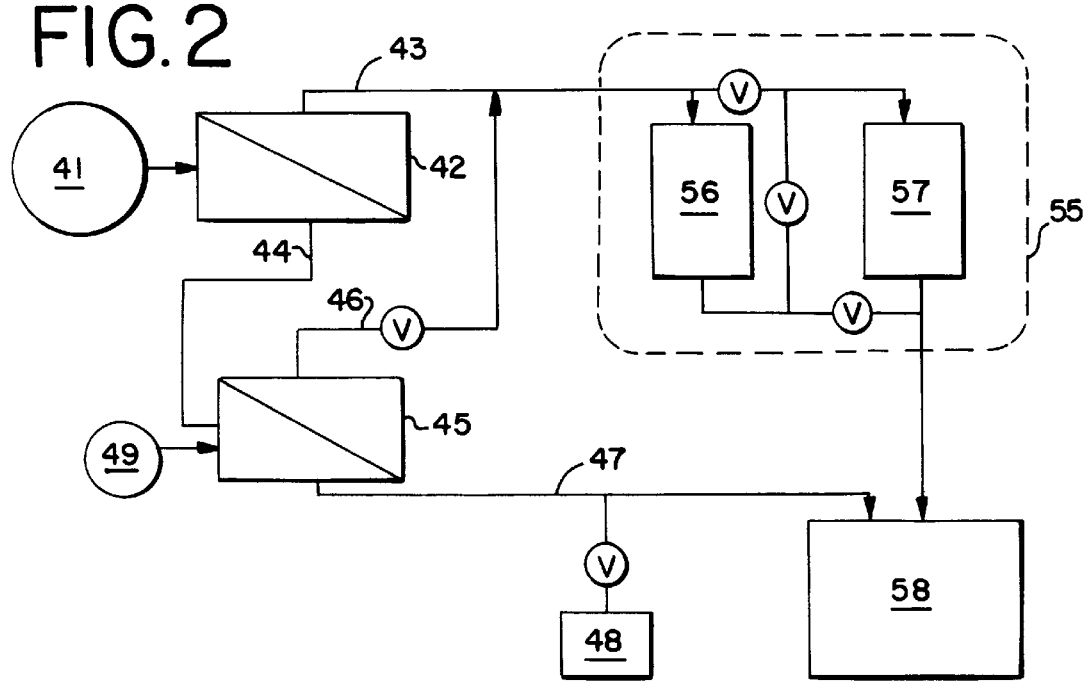
FIG. 2 is a schematic representation of an embodiment of the invention which can be used in preparing a cloudy filler juice and/or cloudy stand-alone citrus juice.

Referring now to FIG. 2, with this embodiment, some or all of the all-natural bland clouding agent is added to the clear juice from a debittering and/or deacidifying section 55. If desired, this addition can be made within a receptacle of cloudy juice product 58, as generally illustrated. Excess all-natural bland clouding agent can be collected in receptacle 48, if all is not to be directly used to form the cloudy juice product 58.

The cloudy juice product 58 in accordance with this embodiment of the invention is useful as a cloudy filler juice or as a cloudy stand-alone juice. The latter product is a unique grapefruit juice which is easily recognized as a grapefruit juice while avoiding what a segment of the population finds objectionable in unprocessed grapefruit juice, especially naringin content and to a lesser extent acidity, while still maintaining virtually the same level of pulp within the grapefruit juice. With this invention, the pulp itself is not a source of objectionable levels of naringin or acidity, but instead the bland pulp or clouding agent is reunited with the modified liquid component flowing from section 55. When the product is to be a cloudy filler juice, usually a lesser quantity of pulp can be added than for a cloudy stand-alone juice.

Generally speaking, in order for a juice to be properly labeled in accordance with governmental regulations, it must be organoleptically recognizable or identifiable as grapefruit juice. Typically, taste tests are instrumental in determining whether or not a juice is recognized as the particular juice, for example grapefruit juice. A clear filler juice having a naringin level in the 120 ppm range and an acidity in the 0.8 weight percent range and a Brix value in the range of 10° Brix may or may not be recognized as grapefruit juice by a majority of taste panelists, whereas adding the all-natural bland clouding agent to this formulation at a level of at least about 5 weight percent, based upon the total weight of the filler juice, results in a cloudy filler juice that consistently has been organoleptically identified as grapefruit juice by a majority of taste panelists.

Importantly, when this same type of cloudy filler juice is used in making a blended juice product, with key juice sources, the fact that the product includes grapefruit juice as one of the juices was not readily detectable. This provides the advantage of providing a filler juice which is a true natural grapefruit juice without the at times perceived negative characteristic grapefruit juice flavor and especially the bitterness associated with it. Such a product has the nutritional positives of grapefruit juice without negatives which are perceived by a large segment of the population.

A citrus juice source 41 flows into membrane filtration unit 42, with the permeate flowing out to transfer member 43 and the citrus pulp retentate flowing to transfer member 44 and into diafiltration unit 45. Wash source 49 flows into the diafiltration unit 45, while transfer member 46 receives the diafiltration permeate and transfer member 47 receives the diafiltration retentate. Debittering columns 56 and/or diafiltration columns 57 of the section 55 perform substantially as described above with respect to section 25.

With more particular reference to the diafiltration units 15 and 45, a number of different units can be used. Included are those incorporating tubular ultrafiltration membrane cartridges. Others are of types which use hollow fiber and ceramic ultrafiltration and/or microfiltration cartridges.

Illustrations of the disclosure herein are provided in the following Examples.

EXAMPLE 1

Grapefruit concentrate was passed through a hollow fiber microfiltration unit, the permeate therefrom being passed through a Koch debittering resin column. During debittering, adsorption of the naringin onto the surface area of the resin material of the commercial unit was carried out. The original naringin level was 735 ppm, and the juice permeate was debittered to a naringin level of about 120 ppm.

The retentate was passed to a hollow fiber microfilter unit including two Koch Supercore modules. Eight gallons of the microfiltration retentate was added to 8 gallons of water, and the resulting slurry was circulated through an ultrafiltration Niro crossflow filtration unit, and 8 gallons of permeate were removed. This profile was repeated four times until the soluble solids/sugars within the retentate dropped below 1.0° Brix. The initial level was 10.87° Brix.

This diafiltration was found to be highly successful in decreasing the naringin concentration from the original value of 735 ppm to a value in the final diafiltration retentate of 86 ppm. This represented an 88% reduction in naringin levels, this having been accomplished with four equal-volume (8 gallon) washings. The initial acid level was 0.88 weight percent. At the final diafiltration, the retentate had an acidity of 0.11 weight percent. Analysis indicated that a very large percentage of the vitamin C was removed during this diafiltration and passed into the permeate. The initial flow into the diafiltration unit had a vitamin C content of 25.89 mg/100 ml, and the final retentate from the diafiltration had a vitamin C level of 3.02 mg/100 ml. A color analysis indicated that there was some change in color, but not a great deal. For example, the flow into the diafiltration unit was analyzed to have a so-called OJ Index of 31.2. After completion of the diafiltration, the retentate had an OJ Index of 28.7. The "L" transmittance was 66.30 going in and 65.38 for the final retentate. The "a" transmittance going in was −4.61, and the final retentate value was −5.14. The "b" transmittance was 18.83 before diafiltration and 12.04 after the last diafiltration.

After the second diafiltration wash, the initial naringin level of 735 ppm was reduced to 223 ppm in the retentate. After the third wash, the naringin level was reduced to 141 ppm, with the fourth wash level being 86 ppm. The initial water wash temperature was 82° F. Each subsequent wash was generally higher in temperature, the highest temperature being 123.2° F. The average wash liquid temperature during the diafiltration operation was 114° F.

EXAMPLE 2

The approach of Example 1 was generally repeated. The feed volume was 6 gallons of the retentate pulp and 6 gallons of water for each of 4 diafiltration washes. The water temperature ranged from 94° F. to 116.8° F. Initial naringin level was 735 ppm. After the first diafiltration wash, the naringin level was reduced to 295 ppm. After two washes, the level was 211 ppm. After three washes, the naringin level was 153 ppm, and after four washes, it was 106 ppm.

Sugars or soluble solids level for the feed into the diafiltration unit was 10.6° Brix. After final diafiltration washing, the value was 0.9° Brix. Initial acidity was 0.88 prior to diafiltration. After the final diafiltration wash, the acidity was 0.12 weight percent. After the last diafiltration wash, the vitamin C level was reduced to 1.40 mg/ml. Color values were an OJ Index of 28.2, a "L" transmittance of 66.03, an "a" transmittance of −5.02, and a "b" transmittance of 10.51.

EXAMPLE 3

Another run was made generally along the lines of Example 1. This utilized a Niro separation skid with two Koch Super-Core modules. Cross-flow filtration was used in the removal of solubilized naringin from the grapefruit juice retentate. In this run, before making the first diafiltration water addition, the retentate was concentrated by initiating the cross-flow without water addition, the water reduction being from about 220 pounds to about 110 pounds, the reduction designating the amount of water removed during this initial concentration step. Thereafter, the 110 pounds of concentrated feed retentate were washed with 110 pounds of water at about 120° F., followed by a second wash of 110 pounds, and then a third wash of 55 pounds of water at about 120° F. Thus, the diafiltration was at 2.5 times the volume of the pulp material being diafiltered.

Initial naringin level was 750 ppm, and the final retentate had a naringin level of 130 ppm. The initial acidity level was 0.91 weight percent, and the final acidity level of the diafiltered retentate was 0.24 weight percent. Initial Brix level was 11.28° Brix, and the final level was 4.35° Brix of the diafiltered retentate. Regarding color, the initial OJ Index was 30.9, and the final OJ Index was 30.7. The "L" transmittance was 67.55 initially and 72.17 after diafiltration. The "a" transmittance was −4.65 initially and −3.83 after diafiltration. The "b" transmittance was 18.44 initially and 18.32 after diafiltration.

EXAMPLE 4

A procedure as generally described with respect to Example 3 was again followed. The initial concentration prior to diafiltration was 1.5 times reduction, and 2 full volume diafiltration steps were carried out. The retentate starting material prior to concentration was as in Example 3. After final diafiltration, the naringin level was 274 ppm, the acid level was 0.33 weight percent, and the sugars content was 4.87° Brix.

EXAMPLE 5

Taste tests were conducted on grapefruit juice products in order to evaluate whether or not the particular grapefruit juice product was identifiable as grapefruit juice. A control grapefruit juice was used in the taste comparisons, the control juice having these specifications: 3.23 pH, an acidity of 1.3 weight percent as citric acid, 10° Brix soluble solids, about 700 ppm naringin, and a natural and untreated pulp concentration of 10.5 volume percent.

A grapefruit juice formulation "A" was prepared as described herein to have the following specifications: 3.48 pH, an acidity of 0.82 weight percent as citric acid, 7.5° Brix soluble solids, 118 ppm of naringin, and a blanded pulp concentration of 12.5 volume percent.

Another grapefruit formulation "B" prepared as described herein had the following specifications: 3.47 pH, an acidity of 0.78 weight percent as citric acid, 9.9° Brix soluble solids, 125 ppm naringin, and a blanded pulp concentration of 12.5 volume percent.

Each participant was questioned if he or she had consumed grapefruit juice within the last 30 days, this question being asked to distinguish grapefruit "users" from "non-users". For the juice "A" test, 28.5% were placed in the user category, and 71.5% were placed in this non-user category. For the juice "B" test, 35% were placed into the user category, and 65% were placed in the non-user category. Each person taste tested the control and the grapefruit juice "A" and was asked if they would identify juice "A" as grapefruit juice. A total of 71.5% identified the juice as grapefruit juice, and 28.5% did not. For juice "B", 70% identified as grapefruit juice, and 30% did not.

A different grapefruit juice product, juice "C" was tested in the same manner. This juice product had these specifications: 3.74 pH, 0.64 weight percent acidity as citric acid, 9.8° Brix soluble solids, 125 ppm naringin, and 12.5% of the all-natural bland pulp in accordance with the invention. This panel had 22.5% grapefruit users and 77.5% non-users. 52.5% of the total respondents identified this juice product as grapefruit juice, whereas 47.5% did not identify it as grapefruit juice.

A further grapefruit juice formulation, juice "D" was subjected to the same taste testing. It was a clear juice as made herein but contained no pulp. Its specifications were as follows: 3.48 pH, 0.82 weight percent acidity as citric acid, 10.1° Brix soluble solids, 123 ppm naringin, and no pulp (whether untreated or blanded). This panel included 30% grapefruit juice users and 70% non-users. A total of only 42.5% of the panelists identified juice "D" as grapefruit juice, whereas 57.5% of the panelists did not identify this as grapefruit juice.

Another grapefruit juice formulation, juice "E" was taste tested in the same manner. Juice "E" had these specifications: 3.48 pH, 0.80 weight percent acidity as citric acid, 10.5° Brix soluble solids, 120.7 ppm naringin, and 3.8 volume percent of the all-natural bland pulp or clouding agent in accordance with the invention. This panel had 25% users and 75% non-users, and 60% of the total respondents identified this juice product as grapefruit juice, whereas 40% did not identify it as grapefruit juice.

EXAMPLE 6

Further taste tests were conducted on grapefruit juice products generally as in Example 5, except the ratio of grapefruit juice "users" to "non-users" was selected to be more in accordance with grapefruit juice consumption in the U.S.A. Also, the control grapefruit juice was consistently tasted after the formulation being evaluated. The control grapefruit juice used in the taste comparisons had these specifications: 3.23 pH, an acidity of 1.30 weight percent as citric acid, 10% Brix soluble solids, 642 ppm naringin, and a natural and untreated pulp concentration of 10.5 volume percent.

Each participant was questioned if he or she had consumed grapefruit juice within the last 30 days. For each test, 10% answered "yes", and these participants constituted the "user" category. Those answering "no" (90%) made up the "non-user" category for the following four formulations.

A grapefruit juice formulation "R" was prepared as described herein to have the following specifications: 3.84 pH, an acidity of 0.84 weight percent as citric acid, 10.1° Brix soluble solids, 118 ppm of naringin, and a blanded pulp concentration of 5.0 volume percent. Each person taste-tested the juice "R" and then the grapefruit control. Each was asked if he or she would identify juice "R" as grapefruit. A total of 87% identified the juice as grapefruit juice, and 13% did not.

Another grapefruit formulation "S" prepared as described herein had the following specifications: 4.47 pH, an acidity of 0.40 weight percent as citric acid, 9.7° Brix soluble solids, 193 ppm naringin, and a blanded pulp concentration of 5.0 volume percent. For juice "S", 67% identified the juice as grapefruit juice, and 33% did not.

A different grapefruit juice product, juice "T" was tested in the same manner. This juice product had these specifications: 4.06 pH, 0.63 weight percent acidity as citric acid, 9.9° Brix soluble solids, 174 ppm naringin, and 5.0% of the all-natural bland pulp in accordance with the invention. 77% of the total respondents identified this juice "T" product as grapefruit juice, whereas 23% did not identify it as grapefruit juice.

A further grapefruit juice formulation, juice "U" was subjected to the same taste testing. It was a clear juice as made herein but contained no pulp. Its specifications were as follows: 3.85 pH, 0.81 weight percent acidity as citric acid, 10.8° Brix soluble solids, 129 ppm naringin, and no pulp (whether untreated or blanded). A total of 69% of the panelists identified juice "D" as grapefruit juice, whereas 31% of the panelists did not identify this as grapefruit juice.

EXAMPLE 7

An orange and cranberry juice blend was prepared which incorporated the grapefruit cloudy filler juice made generally in accordance with FIG. 2. This cloudy grapefruit filler juice had the following average specifications: 3.84 pH, an acidity of 0.80 weight percent as citric acid, 150 ppm naringin, and 4 volume percent of the all-natural clouding agent or pulp prepared as described herein.

This cloudy grapefruit filler juice was concentrated to 59° Brix, after which it had a pH of 5.90. About 410 gallons of this cloudy grapefruit filler juice concentrate were blended with about 180 gallons of orange pulp wash concentrate of 65° Brix and 2.84 pH, about 130 gallons of orange concentrate at 65° Brix and 4.02 pH, about 120 gallons of cranberry concentrate at 47.7 Brix and 11.5 pH, an orange and cranberry flavor formulation, red colorant, and about 320 gallons water. This prepared a concentrated orange cranberry base product. A blended juice product was made from this base. An approximate 1000 gallon batch of such a blended juice product includes about 23 gallons of this orange cranberry base, about 115 gallons of high fructose corn syrup sweetener, and about 865 gallons of water. This single-strength product has an acidity of about 0.5 weight percent acid as citric acid, and is a juice product of about 13° Brix.

Prior to blending, the cloudy filler juice was identifiable as grapefruit juice when at a single strength. In the single-strength blended cloudy juice, the identifiable flavors were those of orange and cranberry and not of grapefruit.

It will be understood that the embodiments of the present invention which have been described are illustrative of some of the applications of the principles of the present invention. Numerous modifications may be made by those skilled in the art without departing from the true spirit and scope of the invention.

We claim:

1. A blended juice product comprising:
   at least one key flavor juice that provides a key juice component which is present at between about 0.5 and about 50 weight percent of the blended juice product;
   a cloudy grapefruit filler juice which is derived from grapefruit juice, said cloudy grapefruit filler making up between about 5 and about 99.5 weight percent of the blended juice product, said cloudy grapefruit filler juice including (a) a clarified and debittered grapefruit juice component having a naringin concentration of between about 20 ppm and about 200 ppm, and (b) an all-natural bland grapefruit pulp clouding agent having a naringin concentration of between about 20 and about 200 ppm; and said cloudy grapefruit filler juice is organoleptically identified as grapefruit juice prior to adding to the blended juice product, and said cloudy grapefruit filler juice is not organoleptically identified as grapefruit juice in the blended juice product.

2. The blended juice product in accordance with claim 1, wherein said key juice component includes a plurality of key flavor juices, each being a flavor other than grapefruit.

3. The blended juice product in accordance with claim 1, wherein said all-natural bland grapefruit pulp clouding agent comprises between about 2 volume percent and about 12 volume percent of the cloudy grapefruit filler juice.

4. The blended juice product in accordance with claim 1, wherein said cloudy grapefruit filler juice has an acidity level of between about 0.3 weight percent and about 0.9 weight percent.

5. The blended juice product in accordance with claim 1, wherein said naringin concentration of said all-natural bland grapefruit pulp clouding agent is between about 50 and about 120 ppm.

6. A cloudy grapefruit juice product prepared from a citrus juice supply having a naringin level of at least about 500 ppm, the cloudy grapefruit juice product comprising:

a clarified and debittered juice component originating from a membrane filtration permeate of a citrus juice supply, which permeate is also debittered;

an all-natural bland citrus pulp clouding agent component provided by diafiltration of a membrane filtration retentate of the citrus juice supply;

said cloudy grapefruit juice product has a naringin content of between about 50 and about 200 ppm of the cloudy grapefruit juice product; and an all-natural liquid byproduct separated from said pulp clouding agent component, and said cloudy grapefruit juice product retains substantially all of the nutrients of the citrus juice supply.

7. The cloudy grapefruit juice product in accordance with claim 6, wherein said clouding agent component comprises at least about 2 weight percent of the juice product, and wherein said cloudy grapefruit juice is organoleptically identified as grapefruit juice.

8. The cloudy grapefruit juice product in accordance with claim 6, wherein said all-natural bland grapefruit pulp clouding agent component comprises between about 3 volume percent and about 12 volume percent of the cloudy grapefruit juice product.

9. The cloudy grapefruit juice product in accordance with claim 6, wherein said cloudy grapefruit filler juice has an acidity level of between about 0.3 weight percent and about 0.9 weight percent.

10. The cloudy grapefruit juice product in accordance with claim 6, wherein said naringin content of the cloudy grapefruit juice is not greater than about 120 ppm.

11. A blended juice product comprising:

at least one key flavor juice that provides a key juice component which is present at between about 0.5 and about 50 weight percent of the blended juice product;

a cloudy grapefruit filler juice which is derived from grapefruit juice, said cloudy grapefruit filler juice making up between about 5 and about 99.5 weight percent of the blended juice product, said cloudy grapefruit filler Juice including (a) a clarified and debittered grapefruit juice component having a naringin concentration of between about 20 ppm and about 200 ppm, (b) an all-natural bland grapefruit pulp clouding agent having a naringin concentration of between about 20 and about 200 ppm, and (c) an all-natural liquid byproduct separated from said pulp clouding agent, and wherein said cloudy filler juice contains substantially all of the nutrients from the grapefruit juice from which it is derived.

12. The blended juice product in accordance with claim 11, wherein said cloudy grapefruit filler juice is organoleptically identified as grapefruit juice prior to adding to the blended juice product, and said cloudy grapefruit filler juice is not organoleptically identified as grapefruit juice in the blended juice product.

13. The blended juice product in accordance with claim 11, wherein said cloudy grapefruit filler juice has an acidity level of between about 0.3 weight percent and about 0.9 weight percent.

14. A process for providing a cloudy citrus juice product, comprising the steps of:

(a) providing a citrus juice supply having a bitterant level of at least about 500 ppm of the citrus juice supply;

(b) passing the citrus juice supply through a filtration unit in order to form a permeate of clarified liquid and a retentate of pulpy liquid;

(c) diafiltering said retentate of pulpy liquid into (i) a diafiltration retentate of a bland citrus pulp having a bitterant level of between about 20 ppm and about 200 ppm of the bland citrus pulp, and (ii) a diafiltration permeate having virtually no pulp and a bitterant level greater than that of said bland pulp;

(d) filtering said permeate of clarified liquid of step (b) in order to debitter same by reducing the bitterant level to between about 20 ppm and about 200 ppm so as to provide a clarified and debittered citrus juice; and (e) combining said bland citrus pulp from step (c) with said clarified and debittered citrus juice of step (d) into a cloudy citrus juice product.

15. The process in accordance with claim 14, wherein the cloudy juice product of step (e) is a filler juice which is organoleptically identified as grapefruit juice and which is not organoleptically identified as grapefruit juice when blended with other juice sources.

16. The process in accordance with claim 14, wherein said cloudy juice product of step (e) is a stand-alone cloudy citrus juice which is organoleptically identified as grapefruit juice.

17. The process in accordance with claim 14, further including debittering the diafiltration permeate of step (c) and adding same to said cloudy citrus juice product.

18. The process in accordance with claim 14, further including deacidifying said permeate of clarified liquid from step (b) to an acid level of between about 0.3% and about 0.9% as citric acid.

19. The process in accordance with claim 17, further including also deacidifying the diafiltration permeate of step (c) in order to provide a debittered, deacidified and clarified permeate having an acidity of between about 0.3% and about 0.9% as citric acid.

20. The process in accordance with claim 14, wherein the citrus juice supply of said providing step is grapefruit juice, and the bitterant is naringin.

21. A cloudy citrus juice product made by the process in accordance with claim 14, wherein said juice product contains substantially all of the nutrients of the citrus juice supply.

22. A process for providing a clarified citrus juice, comprising the steps of:
(a) providing a citrus juice supply having a bitterant level of at least about 500 ppm of the citrus juice supply;
(b) passing said citrus juice supply through a filtration unit in order to form each of a permeate of clarified liquid and a retentate of pulpy liquid;
(c) diafiltering said retentate of pulpy liquid into (i) a diafiltration retentate of a bland citrus pulp having a bitterant level of between about 20 ppm and about 200 ppm of the bland citrus pulp, and (ii) a diafiltration permeate having virtually no pulp and a bitterant level greater than that of said bland pulp; and
(d) debittering both said permeate of clarified liquid of step (b) and said diafiltration permeate of step (c) in order to debitter same to a bitterant level of between about 20 and about 200 ppm so as to provide a clarified and debittered citrus juice which includes a juice component originating from said pulpy liquid of step (b).

23. The process in accordance with claim 22, wherein said clarified citrus juice product is organoleptically identified as grapefruit juice.

24. The process in accordance with claim 22, further including deacidifying said clarified and debittered citrus juice to an acid level of between about 0.3% and about 0.9% as citric acid.

25. The process in accordance with claim 22, wherein the citrus juice supply of said providing step is grapefruit juice, and the bitterant is naringin.

26. A clarified citrus juice product made by the process in accordance with claim 22, wherein said juice product contains substantially all of the nutrients of the citrus juice supply.

27. A blended juice product comprising:
at least one key flavor juice that provides a key juice component which is present at between about 0.5 and about 50 weight percent of the blended juice product;
a clarified grapefruit filler juice which is derived from grapefruit juice, said clarified grapefruit filler juice making up between about 5 and about 99.5 weight percent of the blended juice product, said clarified grapefruit filler juice including (a) a clarified and debittered grapefruit juice component having a naringin concentration of between about 20 ppm and about 200 ppm, and (b) a clarified and debittered all-natural liquid permeate from diafiltration of grapefruit pulp, said liquid permeate having a naringin concentration of between about 20 and about 200 ppm; and
said clarified grapefruit filer juice contains substantially all of the nutrients of the grapefruit juice from which it is derived.

28. The blended juice product in accordance with claim 27, wherein said key juice component includes a plurality of key flavor juices, each being a flavor other than grapefruit.

29. The blended juice product in accordance with claim 27, wherein said grapefruit filler juice is organoleptically identified as grapefruit juice prior to adding to the blended juice product, and said grapefruit filler juice is not organoleptically identified as grapefruit juice in the blended juice product.

30. The blended juice product in accordance with claim 27, wherein said all-natural grapefruit liquid permeate comprises between about 2 volume percent and about 20 volume percent of the cloudy grapefruit filler juice.

31. The blended juice product in accordance with claim 27, wherein said grapefruit filler juice has an acidity level of between about 0.3 weight percent and about 0.9 weight percent.

32. The blended juice product in accordance with claim 27, wherein said naringin concentration of said liquid permeate is between about 50 ppm and about 120 ppm.

* * * * *

UNITED STATES PATENT AND TRADEMARK OFFICE
CERTIFICATE OF CORRECTION

PATENT NO : 6,054,168
DATED : April 25, 2000
INVENTOR(S) : Theodore S. Lioutas and Osvaldo Chu It is certified that error appears in the above-identified patent and that said Letters Patent are hereby corrected as shown below:

Col. 3, lines 38-39, delete the space in "bitterant (s)" so it reads --bitterant(s)--.
Col. 9, line 10, after "identified" insert --the juice--.
Col. 10, line 36, "47.7" should read --47.7°--; line 63, "filler making" should read --filler juice making--.
Col. 11, line 67, delete "Juice" and insert --juice--.
Col. 14, line 12, delete "filer" and insert --filler--.

Signed and Sealed this

Tenth Day of April, 2001

Attest:

NICHOLAS P. GODICI

Attesting Officer

Acting Director of the United States Patent and Trademark Office